United States Patent [19]
Landecker

[11] Patent Number: 4,679,753
[45] Date of Patent: Jul. 14, 1987

[54] SURVEYING SATELLITE INCORPORATING STAR-SENSING ATTITUDE DETERMINATION SUBSYSTEM

[75] Inventor: Peter B. Landecker, Manhattan Beach, Calif.

[73] Assignee: Hughes Aircraft Company, Los Angeles, Calif.

[21] Appl. No.: 643,130

[22] Filed: Aug. 21, 1984

[51] Int. Cl.$^4$ ............................................. B64G 1/36
[52] U.S. Cl. ............................... 244/171; 250/203 R
[58] Field of Search ................. 244/171; 73/178 R; 250/203 R; 364/455

[56] References Cited

U.S. PATENT DOCUMENTS

| | | | |
|---|---|---|---|
| 3,311,747 | 3/1967 | Smith, Jr. et al. | 250/203 R |
| 3,488,504 | 1/1970 | Lowen et al. | 244/171 |
| 3,676,581 | 7/1972 | Swet . | |
| 3,715,594 | 2/1973 | Drohan et al. | 250/203 R |
| 3,752,993 | 8/1973 | Davidson et al. | 244/171 |
| 4,358,076 | 11/1982 | Lange et al. | 244/171 |

FOREIGN PATENT DOCUMENTS 874695  7/1979  Belgium .

OTHER PUBLICATIONS

A Survey of Attitude Sensors for Spacecraft; 12/67 by: Norman M. Hatcher.
Electronics, vol. 46, No. 4, Jul. 5, 1973, p. 34, "On--Board Navigation Sought for Satellites".

*Primary Examiner*—Galen Barefoot
*Assistant Examiner*—Mark R. Valliere
*Attorney, Agent, or Firm*—S. M. Mitchell; M. J. Meltzer; A. W. Karambelas

[57] ABSTRACT

A system for surveying features of a planet includes a novel attitude determination subsystem. A satellite includes an earth imaging sensor (106). The sensor is alternately directed at the earth and a predetermined star field. The optical detections are converted to electronic signals by a sensor electronics module (332). The outputs of the sensor electronics module corresponding to the times when the sensor is directed toward earth are processed by a signal processor (336), the output of which is a data stream which permits image reconstruction by a ground station computer. The outputs of the sensor electronics module corresponding to the times when the sensor is directed toward the star field are directed through onboard star detection thresholding electronics. A programmable threshold device (342) selects detections of target stars within the star field. A star data buffer (344) stores these target star detections for transmission to earth at a convenient time. This data stored by the buffer is compact star attitude determination data required for accurate gridding of the earth image data transmitted from the signal processor. In an alternative embodiment, an earth imaging sensor is occasionally pointed at a limited portion of the star field, such special motion being controlled from the satellite. In both embodiments, compression of star field data is accomplished by means located onboard the satellite. The compressed star field data is subsequently used to accurately determine sensor attitude.

8 Claims, 6 Drawing Figures

SURVEYING SATELLITE INCORPORATING STAR-SENSING ATTITUDE DETERMINATION SUBSYSTEM

BACKGROUND OF THE INVENTION

The present invention relates to a system for remote sensing of the features of a celestial body, and, more particularly, to such a system with a star-sensing attitude determination subsystem.

Remote sensing of celestial bodies, including the earth, is finding increasing applications in meteorology, land resources surveying, planet mapping, and surveillance. In the future, remote sensing will play an increasingly important role as the human race explores and monitors planets, comets, asteroids and other natural and man-made celestial bodies. Remote sensing systems typically employ a satellite, or other spacecraft, with one or more image sensors, and at least one remote station for image display.

Generally, remote sensing involves mapping individual picture elements (pixels) to a coordinate system representing the scene being surveyed. For example, in locating a particular weather feature, a meteorological satellite system assigns to each pixel an earth latitude and longitude. This mapping consists of two transformations: an attitude transformation relating pixel and inertial coordinates, and an orbital transformation relating inertial and earth coordinates.

In order for the mapping to be valid, both transformations must be performed accurately. The accuracy of the transformation to earth coordinates depends on the accuracy of attitude and location of the camera or other imaging device. Errors in attitude and location can result in the mislocation of weather features, for example. Where multiple sensors are involved, e.g. sensors incorporating detectors with different spatial or spectral sensitivities, the mappings for separate sensors should be coaligned to provide a consistent composite image. Alternatively, a way of co-registering the data from multiple sensors is often required.

Since a small angular error translates into a significant displacement on the surface of a scene when spacecraft distances are involved, attitude determination is particularly critical. For example, at geosynchronous altitude, about 35,800 km, generally used for meteorological applications, a 280 $\mu$RAD angular displacement results in a 10 km ground displacement. In certain of the ground operations, for example, gridding and wind velocity extraction, such errors can seriously affect forecasting accuracy so that it is necessary to keep these errors as small as possible.

The gridding requirements vary by application. NASA/GSFC (National Aeronautics and Space Administration/Goddard Space Flight Center) has indicated a registration requirement of 2 km earth surface gridding accuracy and the National Weather Service requires 1 km accuracy.

Users have found the NOAA/NESDIS (National Oceanic and Atmospheric Administration/National Earth Satellite Data and Information Service) grids can sometimes be incorrect by as much as 50 km. Also, spacecraft maneuver performance uncertainties, usually greater than 10%, result in inaccuracies in post-maneuver predicted orbit-attitude states. Accordingly, for about eight hours following a spacecraft orbit maneuver, the grid placement accuracy is sometimes worse than 50 km.

Thus, it has been very difficult to obtain the precision required for detailed mapping or coalignment. For example, spacecraft attitude uncertainties currently limit the precision of earth-referenced grid determination and placement on meteorological satellite images, as well as the accuracy of products such as wind vectors. Hence, the precision of subsequent meteorological forecasts is degraded in time and/or location.

Many satellites have incorporated sensor subsystems dedicated to attitude determination. For example, the orientation state of a spinning spacecraft is usually determined by dedicated earth, sun, and/or star sensors.

However, there is a problem coaligning the dedicated attitude sensor with the primary imaging payload. Prelaunch calibration is suspect in view of the stresses of satellite deployment which can alter the relative physical location of the attitude and imaging sensors. In addition, on-orbit thermal distortion can significantly alter the relative sensor alignment as a function of time.

Since the star, sun and earth-limb sensing attitude determination subsystems have incorporated sensors in addition to the primary surveying sensor, there has been a penalty in cost and complexity. For example, a typical star sensor can cost $1,000,000, weigh 50 lbs., and consume 50 watts. Two or three are normally required for accuracy as well as redundancy since satellites are relatively inaccessible for repairs. The additional power, weight and complexity interact more than linearly to increase satellite system design, manufacture and launch costs.

Attempts have been made to employ a primary imaging sensor for attitude determination to meet the stringent accuracy requirements of geosynchronous meteorological satellites. To date, two such methods have been used operationally: earth-landmark tracking and earth-horizon or earth-limb tracking.

As indicated by the performance of current weather satellites, earth features are generally not sufficiently distinct to provide precise attitude determinations, and they are subject to cloud obscuration. Furthermore, where the same features are used to determine satellite location as well as attitude, uncertainties are introduced in attempting to decouple the two variables. In addition, decoupling burdens the computational system with complex algorithms, consuming time and costly processing power.

Occasional pointing of a sensor toward the sun has been considered. However, it has proved difficult to manufacture high resolution sun sensors, due in part to "jitter", e.g., electronic sensor or solar variations. Furthermore, the sun provides only one inertial reference and at least two inertial references are required to determine attitude.

Star sensors have an advantage over earth and sun sensors in that their targets are point source emitters of predictable amplitude. However, operational star-sensing systems utilize a separate attitude sensor so coordination between the star (or separate sun sensor) data and the surveying sensor introduces relative alignment uncertainties as a function of time. This is due in part to initial misalignment, mechanical distortions due to launching stresses, and thermal distortions as a function of time in orbit.

Bright stars are occasionally observed within the operational field of view of a primary surveying sensor just above the limb of the earth, as noted by Doolittle et al. in "Attitude Determination Support for SMS/GOES Satellites", *NOAA Technical Memorandum NESS* 64, C. L. Bristor, editor, 1975, pp. 26-32. However, since the probability that a star of useful magnitude will appear above the earth's limb in, for example, a 20°×20° frame is about 2%, it has not been feasible to use only such star information routinely in attitude determination.

A surveying earth sensor located on the rotor of a spin-stabilized spacecraft has provided attitude data from stars during special backscan tests, as disclosed by McIntyre et al. in "A Star Scan/Attitude Determination Experiment Conducted on the Geostationary Meteorological Satellite", *Acta Astronautica*, Vol. 7, pp. 137-154, Pergamon Press Ltd., 1980, U.K. The authors were able to detect four or five stars generally visible and available for attitude determination. They also disclosed algorithms for determining spacecraft attitude from the meteorological satellite star data.

McIntyre et al. acknowledge that their attitude determination procedure interfered unacceptably with the primary meteorological viewing of the sensor. This is due in part to the time involved in gathering the required volume of star data. In the disclosed system, star sensing precluded earth observation for more than an hour. This preclusion translated into the loss of multiple frames of earth meteorological data. This magnitude of loss is unacceptable as a normal operating mode.

SUMMARY OF THE PRESENT INVENTION

An imaging system includes a satellite, or other spacecraft, with a sensor which alternately functions to survey a planet and to scan a star field to determine attitude. The system includes electronics or other means for processing or analyzing the planet surveying data. Star field data are compressed for example, by thresholding or by scanning over only selected portions of the star field. The compressed data is analyzed to provide a sensor attitude determination.

The present invention provides for determination of sensor location and attitude. The location and attitude information is then used to obtain accurate gridding for the surveying system. The invention can be applied to a control system for correcting attitude in response to star-sensing attitude determination.

Some realizations of the present invention include multiple sensors. In one realization, a spin-stabilized spacecraft includes plural spinning sensors. In another realization of the present invention, a spin-stabilized spacecraft includes a spinning sensor and a constantly planet-directed sensor. In either embodiment, occasional star sensing by plural sensors provides accurate coalignment, while routine attitude determination for all sensors is provided by a single spinning sensor.

In another realization of the present invention, attitude determination is provided for a three-axis stabilized spacecraft by directing a nominal earth sensor periodically toward a star field. Where the three-axis spacecraft has multiple sensors, coalignment is provided by occasionally pointing plural sensors toward the star field. Thereafter, attitude determination can be provided routinely using only one of the sensors.

The present invention provides several advantages over available satellites. The disclosed attitude determination subsystem is very accurate, in part, because it employs point source radiometric targets. Further, the subsystem avoids some of the misalignment problems due to the use of a separate sensor.

The attitude determinations are provided fast enough so that very little or no loss of primary data occurs in a meteorological satellite. Further, stars are not subject to cloud obscuration, as are landmarks. Also, in lieu of an extra sensor, and the additional mass, bulk and power consumption it would require, all that is needed is a small addition to the sensor electronics already used in current systems.

Since stars are, for practical purposes, infinitely distant and therefore inertially fixed, the spacecraft orientation can be evaluated independently of its orbit (i.e., the attitude and orbit processes uncouple). Finally, the use of stars to determine attitude is conceptually straightforward and numerically very simple in comparison with the use of earth-limb or earth-landmark data.

A star scan can provide an accurate attitude update almost immediately, while the other methods require anywhere from 6 to 24 hours of data collecting and processing, since the data must be spread out in right ascension in order to achieve an accurate update. With stars, the right ascension spread is provided in a few minutes by the spinning motion of the spacecraft and the scan mirror stepping. Earth data, on the other hand, receives its right ascension spread from the satellite orbital motion, which, at geosynchronous altitude, has a 24 hour period. Thus, the first few pictures following a spacecraft maneuver are much more accurately processed using a star data attitude update rather than an earth-limb or landmark update. All five parameters in the state vector, discussed by McIntyre (Ibid.) are determined with sufficient accuracy from star data.

While sharing the strong points of McIntyre's approach, the present system has significantly less stringent requirements for processing time and communication bandwidth. These advantages permit attitude determination without significantly interfering with the primary imaging/surveying/sounding mission of the spacecraft.

DESCRIPTION OF THE PREFERRED EMBODIMENTS

Figure 1:
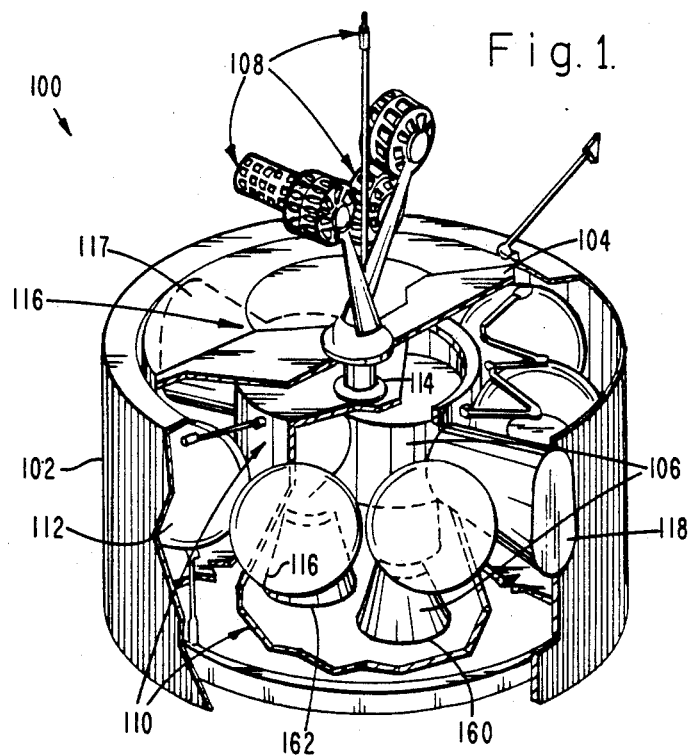
FIG. 1 is a cut away perspective view of a satellite in accordance with the present invention.

A spin-stabilized satellite 100 comprises a spun portion or "rotor" 102, and despun portion, or "platform" 104, as illustrated in FIG. 1. A meteorological image sensor 106 is mounted on the rotor 102 and provides periodic image data or surveying information of the earth. An earth-oriented communications payload 108 transmits image data to and receives commands from earth. Also apparent are a thrust tube 110, propellant tanks 112 and a bearing and power transfer assembly 114.

The satellite 100 employs a second sensor 116, similar to the sensor 106 referred to above, to allow concurrent independent sensor operations and to provide redundancy. Each sensor 106, 116 includes a sunshade 118, 117 and a radiative cooler 160, 162. Since the sensors 106 and 116 are similar, the following detailed description of the first sensor 106 applies in its essentials to the second sensor 116 as well.

Figure 2:
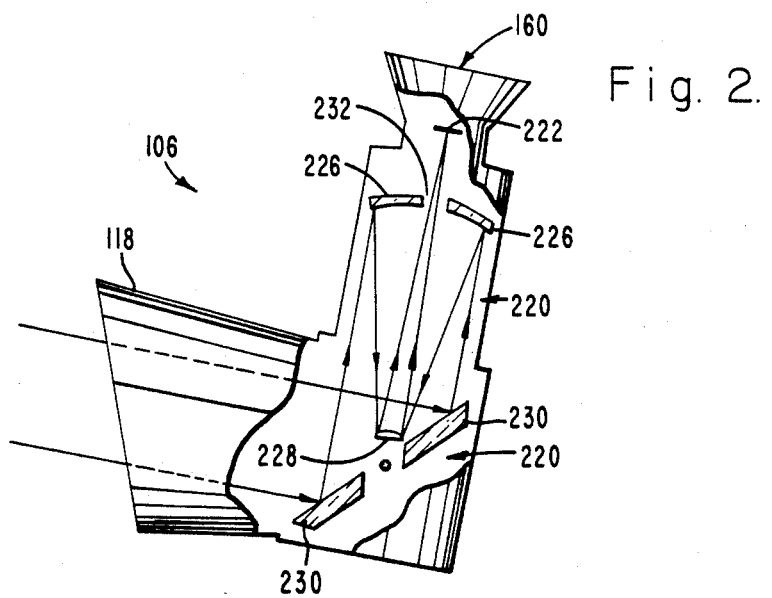
FIG. 2 is a sectional view of a sensor used in the satellite of FIG. 1.

The sensor 106 is a visible and infrared spin scan radiometer, and, as shown in FIG. 2, includes an aperture with the surrounding sunshade 118, a mirror cavity 220, a detector plane 222, and the radiative cooler 160. The mirror cavity 220 houses a primary mirror 226, a secondary mirror 228 and a scan mirror 230. The primary mirror 226 includes an aperture 232 to permit an image to exit the mirror cavity 220.

The detector plane 222 is populated with several visible light detectors and several infrared detectors (not shown). The visible light detectors used in the star sensing respond to radiation in the 0.5 to 0.8 micron band, and have a common field of view corresponding to 1 km ground resolution at the subsatellite point. These detectors have root-sum-square amplitude low enough to permit detection of several bright stars.

While the detectors used in star sensing are also used in earth sensing, special detectors can be included on the detector plane 222 to increase sensitivity. In one alternative embodiment, special detectors increase the star signal-to-noise ratio by optimizing the photon wavelength bandpass. In another embodiment, a specialized two-dimensional detector is used to locate a star more quickly and/or accurately.

The illustrated embodiment incorporates eight silicon photodiode visible light detectors for star sensing. Photomultiplier tubes (PMT) are an alternative. A charge-coupled device (CCD) could be used in a time delay and integration (TDI) mode, which produces pulses with continuously variable amplitude, whereas the CCD and PMT generate a continuously variable waveform.

A drive motor (not shown) steps the scan mirror 230 through series of North-South latitudes, each latitude characterizing a West-East scan effected by the spinning motion of the rotor 102. An optical encoder (not shown) monitors the orientation of the scan mirror as a function of time. The optical encoder determines the orientation of the scan mirror 230 to the nominal optical axis of the sensor 106. The resulting determination is correlated with orientation and location data to determine the geographic location of the field of view on the surface of the earth.

Figure 3:
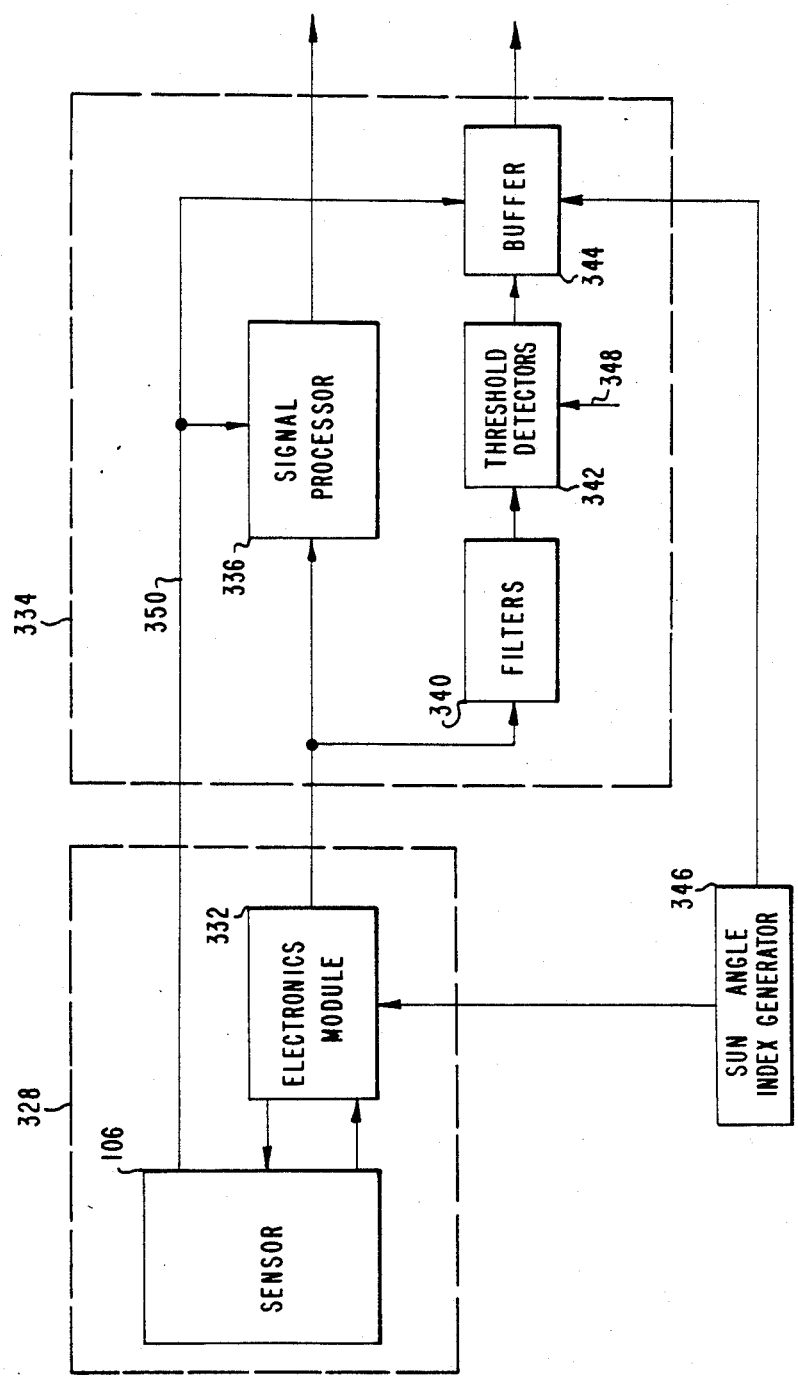
FIG. 3 is a block diagram of the sensor and electronics subsystems of the satellite of FIG. 1.

The output of the sensor 106 is directed to a sensor electronics module 332, shown in FIG. 3. The sensor and electronics module form an instrument unit 328. The sensor electronics module 332 amplifies the signals and controls the operation of the sensor 106, e.g., directs the scanning mirror 230, selects which detectors of the sensor are to be operational, institutes a sensor calibration mode, and monitors instrument temperatures and voltages. The sensor electronics module 332 coordinates the sensor scanning in response to pulse data from a sun angle index generator 346 to allow computation of the earth's angular position relative to the spin phase of the satellite rotor 102.

The amplified outputs of the sensor electronics module 332 are directed to a digital multiplexer 334 which filters and digitizes the analog signals, and formats them in a signal processor 336 prior to transmission to a central ground station.

In this embodiment, the digital multiplexer 334 also contains the star detection subsystem consisting of the eight filters 340, eight variable threshold or variable gain electronics star detectors 342, and a star data buffer 344. The signals for the visible light detectors are routed through the filters 340 to eliminate or reduce components of the signals which are uncharacteristic of a star pulse, e.g., shot-type noise, steady state components, and high frequency noise pulses.

Since the illustrated detector plane 222 produces a continuous waveform, filters 340 are matched filters tailored for star pulse detection. For the pulsed signal produced by a CCD imager in TDI mode, a simple low pass filter is more appropriate. In an alternative embodiment, special gain-programmable amplifiers are used in conjunction with fixed threshold electronics to increase onboard sensitivity for star detection.

The filtered star signals are directed to the variable threshold detectors 342, which use predetermined criteria to select signals above a programmable threshold level. Thresholding is accomplished using fixed electronic gain and programmable onboard minimum pulse height circuitry. An alternative embodiment uses programmable onboard star signal amplification and use of a fixed minimum pulse height threshold.

The criteria may be selected and programming performed by ground command (indicated at 348) so as to optimize the number of star detections. Too high a threshold level results in missed star detections. Too low a threshold increases the likelihood of false detections, which can fill the star data buffer 344 with meaningless data. The threshold is set so that the number of star detections per scan is generally less than the number of registers in the buffer. The illustrated buffer 344 has sixteen registers.

When an event exceeds the programmed threshold, the visible detector number, the sensor scan line number, the sensor azimuth angle, and the pulse height of the detection are directed to and stored by the star data buffer 344. The star azimuth angle is provided by the sun angle index generator 346. The detector number and pulse height are obtained from the threshold detectors 342, and the scan line number is obtained directly from the sensor 106 via path 350. The buffer 344 accepts the candidate star data and transmits the data to an earth station at a convenient part of the satellite's spin cycle.

To prevent saturation of the buffer 344, the programmable star detector 342 employs sun and moon block circuitry (not shown). An alternative embodiment divides the buffer into two halves. The first half is filled with the first star detections after earth viewing and the second half is filled with the last star detections just before earth viewing. This second system also prevents a large number of sun and moon detections from saturating the star data buffer 344.

A third approach to avoiding saturation uses programmable windows. These windows are used to limit detections to events close to those that occur within a predefined area, centered on the expected location of an attitude reference star. This method results in very few recorded noise pulses. Thus, the programmable threshold can be reduced to detect many more stars with a lower signal-to-noise ratio before the capacity of the star data buffer 344 is exceeded.

The illustrated embodiment includes electronics (not shown) to limit the number of recorded detections due to any one detector to 20%-30% of the registers. This is effected by adjusting the threshold of each detector individually. Accordingly, saturation at the star data buffer by false hits due to a noisy detector is avoided.

In the satellite 100 of FIG. 1, the sensors 106 and 116 are located 180° apart on the spinning rotor 102. Initially, both sensors 106 and 116 scan the star field. Comparison of the perceived star fields provides the data to determine the relative coalignment of the sensors. Once coalignment as a function of time is determined, the second sensor 116 may be switched off during its backscan to save power, data throughput, and transmission bandwidth. Alternatively, the backscan data from the second sensor 116 can be used to verify the attitude determination provided by the first sensor 106.

Figure 4:
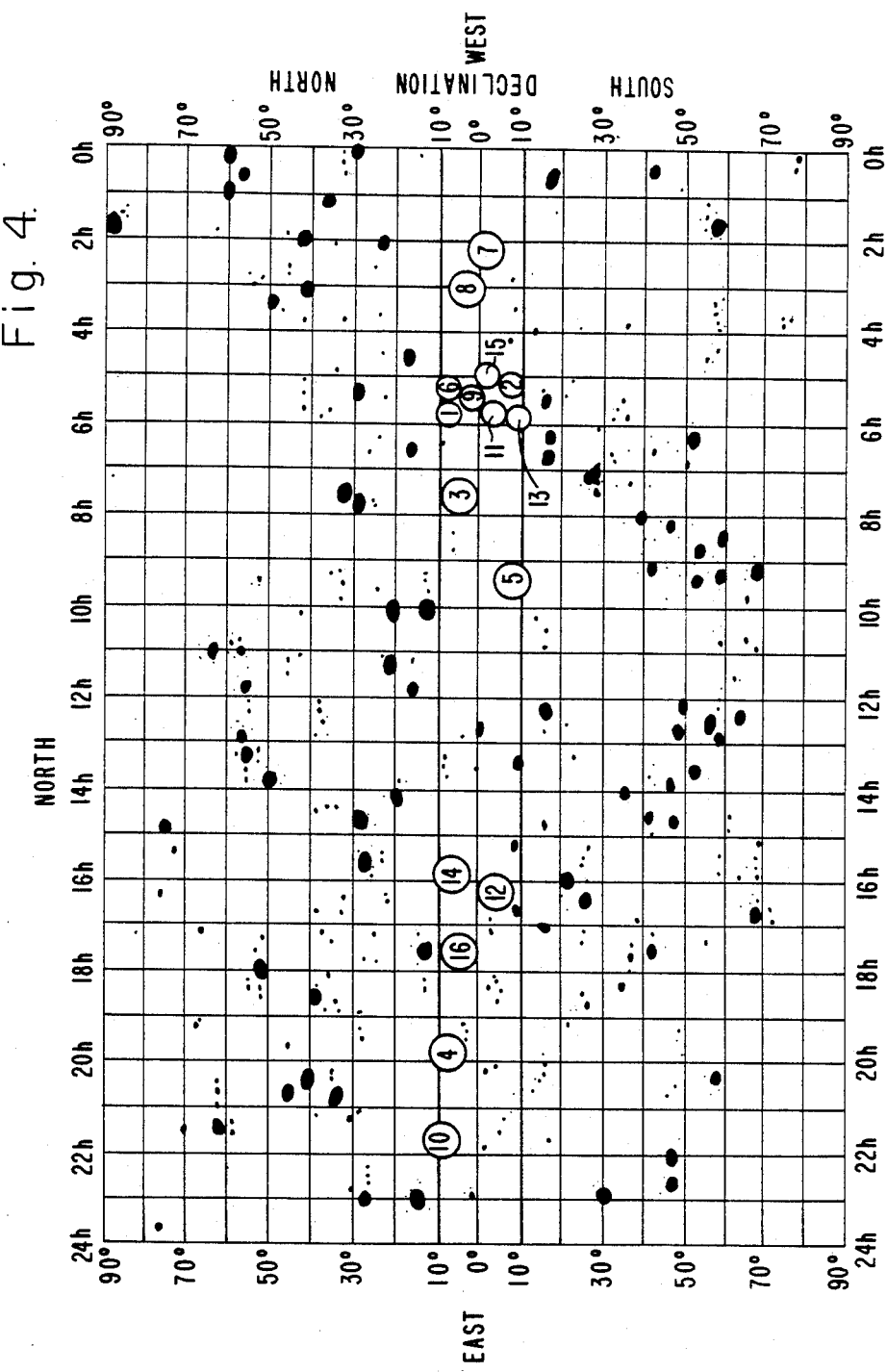
FIG. 4 is a star map indicating stars detectable by the sensor subsystem of FIG. 2.

FIG. 4 shows the one hundred brightest stars in celestial (equatorial) coordinates. The sixteen brightest stars in the 20° declination band centered at the equatorial plane are numbered in order of decreasing brightness. Stars 1-9 and 11 are located in the 18° declination band. In this embodiment, these stars are observable using readily available silicon photodiode, CCD or PMT detectors with a 0 percent efficiency outside the 0.550 to 0.725 micron wavelength band and a 170 kHz equivalent bandwidth electronic filter. In order of their brightness, these stars (and their flux threshold in units of $10^{-14}$ W cm$^{-2}$) are: Betelgeuse 1 (18.3), Rigel 2 (9.1), Procyon 3 (8.9), Altair 4 (5.4), Alphard 5 (2.9), Belatrix 6 (2.2), Mira 7 (2.2 at maximum brightness), Menkar 8 (2.2), Alnilam 9 (2.1), and Alnitak 11 (2.0). Where a 20° declination band is used, Enif 10 (2.0) is available, and just above Alnitak 11 in brightness.

By doubling the sensitivity of the detector (increasing the star detection signal-to-noise ratio or alternatively limiting the star search to areas near expected locations of the few bright stars), five more stars are available for attitude determination: Yed Prior 12 (1.7), Unukalhai 13 (1.4), Mintaka 14 (1.3), Cheleb 15 (1.2) and Sadalmelik 16 (1.0). Adding these reference points would provide greater backup in the event that Altair 4 is obscured. However, the following discussion conservatively depends on the detectability of only the ten brightest stars in the 18° declination band.

When one of these stars or another event occurs above the programmed threshold, 12 bits of sensor scan line number, 3 bits of visible detector number, 22 bits of sun-angle pixel azimuth location and 6 bits of pulse amplitude information are stored in a buffer register. A very small average data rate results, since 43 bits per event at a frequency of about 100 events in 10 minutes corresponds to only 7 bits per second of useful star-housekeeping data.

For the case of a nominal update of the spin state using a seven-component state vector (see McIntyne, Ibid), including the spin axis precession, there is a need to detect only one or two stars per hour in order to track a 0.03°/day precession rate. Therefore, for this normal operational case, only occasional star sensing is required.

Following maneuvers, the satellite attitude is poorly known, and a minimum of three stars is required to determine the five-component state vector. For an accurate attitude update following maneuvers, these stars should be separated by at least 100° and 15° in right ascension and declination, respectively.

In this embodiment, the star detection threshold is set according to the formula:

$$T=[FB/(150\ kHz)]^{\frac{1}{2}}(2.5/SN)\ (2.8\times 10^{-14}\ W\ cm^{-2}/SF)$$

where FB is the filter bandpass in kHz, SN is the nominal sensor signal-to-noise earth viewing specification, and SF is the silicon photodiode to photomultiplier solar spectrum relative signal-to-noise ratio, or solar factor.

From FIG. 4, it is clear that detection of the ten brightest stars in the 18° declination band results in a good spread in right ascension and, hence, attitude accuracy. Using the location data of the brightest stars, it is possible to determine the spacecraft attitude accurately enough to permit grid placement to a fraction of a visible detector, instantaneous geometric field-of-view (IGFOV), or less than 28 microradians. This is much more accurate than the currently used landmark, earth-limb or sun sensor methods.

Position data for most or all these stars are recorded in typical picture frame time of 16 minutes. A corresponding sweep of right ascension using earth landmarks would take almost 24 hours. Attitude uncertainties, especially following spacecraft maneuvers, are thus much more quickly resolved using star sensing rather than earth sensing.

Additional advantages of the present approach are: lack of cloud obscuration of landmarks; excellent point source radiometric targets; no hardware misalignment with respect to a separate star sensor; simplification of attitude computations (since attitude and location uncouple); and the non-necessity of a separate star sensor for attitude determinations. Furthermore, these advantages accrue with negligible loss of meteorological data.

Figure 5:
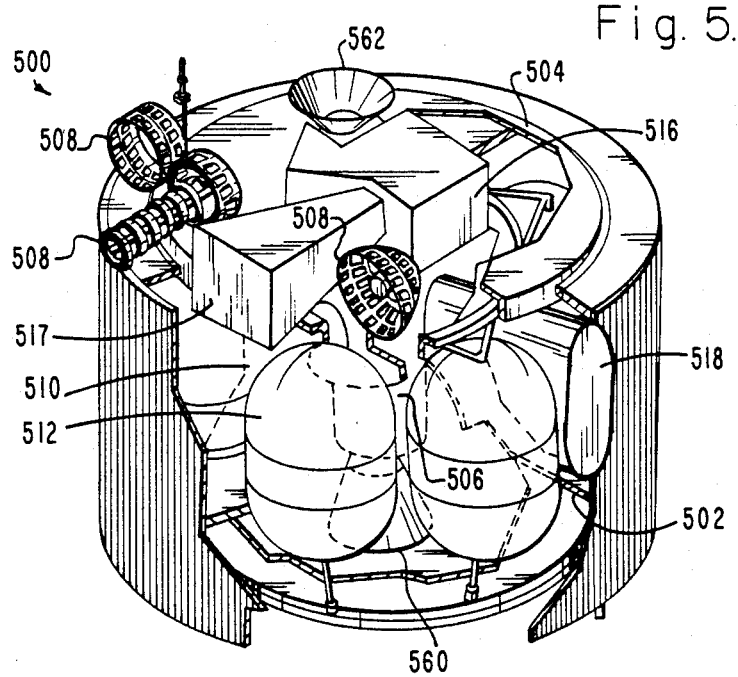
FIG. 5 is a cut away perspective view of another satellite, this satellite having a spinning sensor and a despun sensor, in accordance with the present invention.

In the embodiment illustrated in FIG. 5, a satellite 500 includes a spinning sensor 506 and a despun sensor 516. In this example, the spinning sensor 506 is an imager and the despun sensor 516 is a sounder. As with the previous embodiment, this satellite 500 includes a rotor 502, a platform 504, a communications payload 508, propellant tanks 512, and a thrust tube 510. Each sensor 506, 516 includes a sunshade 518, 517 and a radiative cooler 560, 562.

As discussed above, the spinning sensor 506 records meteorological data while viewing the earth, and star data during the backscan. The despun sensor 516 records star data above the limb of the earth. Thus, infrequent star detections by the despun sensor 516 can be used for coalignment, and the periodic star detections by the spinning sensor 506 can be used for ongoing attitude determination for both sensors 506 and 516. Alternatively, the despun sensor 516 can be rotated temporarily to perform the initial coalignment so that the system is not dependent on stars appearing within an earth frame.

Figure 6:
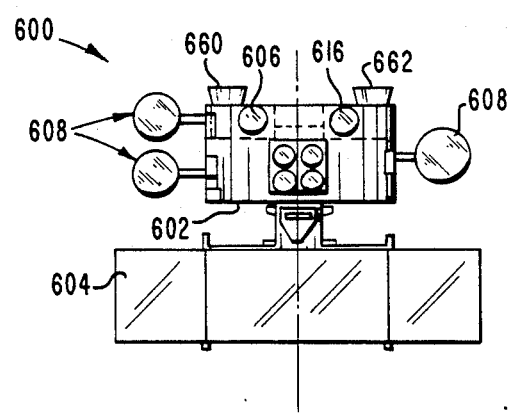
FIG. 6 is an elevational view of a three-axis satellite having nominally earth-directed sensors in accordance with the present invention.

A three-axis stabilized satellite 600 in accordance with the present invention includes a main body 602, and outboard solar panels 604, as illustrated in FIG. 6. Connected with the main body 602 are communications antennas 608, and two sensors 606 and 616, each with a respective radiative cooler 660, 662.

Each of the two sensors 606, 616 is directed to a respective portion of the earth using a two-axis mirror scan system and angular position encoders (not shown). One sensor 606 is routinely directed toward a star field for attitude monitoring. The other sensor 616 occasionally gathers star data for coalignment.

In the case of the despun sensors 516, 606 and 616 of satellites 500 and 600, a special onboard scan sequence over a limited portion of the star field is used to spatially select stars for sensor attitude determination. Sensor motion is modelled between the time it views the planet and the star field to compensate for momentum shifts induced by the sensor's movement. The attitude determination subsystems for satellites 500 and 600 are similar to the attitude determination subsystem of FIG. 3 for satellite 100, differing only in respects obvious to those skilled in the art.

In accordance with the foregoing, systems for surveying features of a planet are presented with advantages in surveying precision, speed and economy over available systems. The present invention provides for many alternatives to the described embodiments. Different targets, detectors, and thresholding or star scanning electronics can be employed. In systems providing for coalignment, the multiple sensors can be identical or different to provide specialized functions. Likewise, the detectors employed can have different spatial and spectral sensitivities. The invention applies to mobile spacecraft and non-geostationary satellites. These and other modifications and variations are within the scope of the invention as defined by the following claims.

What is claimed is:

1. A system for surveying features of a planet, said system comprising:
   a spacecraft;
   a sensor for producing a signal in response to radiation from a source, the amplitude of said signal corresponding to the radiation flux at the sensor produced by the source, said sensor being located onboard said spacecraft;
   means for alternately directing said sensor toward said planet and toward a predetermined star field;
   means for analyzing said sensor signal when said sensor is directed toward said planet to provide surveying information concerning said features of said planet;
   a buffer for storing star field data signals from said sensor;
   star field data compression means for selecting signals from said sensor when said sensor is directed toward said star field, said signal selection being performed to optimize the number of star detections and avoid saturation of said buffer; and
   means for analyzing said selected signals to provide sensor attitude information.

2. The system of claim 1 further comprising spacecraft location determining means for providing data identifying the location of said satellite with respect to said planet, and means for coordinating said location information with said attitude information to provide accurate determinations of the pointing of said sensor relative to said planet.

3. The system of claim 1 further comprising means for controlling the attitude of said spacecraft in response to said attitude information.

4. The system of claim 1 further comprising a second sensor for providing a signal the amplitude of which corresponds to the flux at the sensor caused by a source, and means for alternately directing said second sensor toward said planet and toward a star field so that the relative alignment of said first and second sensors can be determined.

5. The system of claim 1 further characterized in that said spacecraft is spin-stabilized and includes a rotor and a platform, said sensor being incorporated into said rotor so that said sensor alternately records planet and star field data as the rotor rotates.

6. The system of claim 1 further characterized in that said spacecraft is three-axis stabilized.

7. The system of claim 1 further characterized in that said compression means includes thresholding means for selecting only star detections above an optimum threshold level, said compression means being located onboard said spacecraft.

8. The system of claim 1 further characterized in that said compression means includes means for scanning said sensor over a limited portion of said star field, said compression means being located onboard said spacecraft.

* * * * *